(12) United States Patent
Koikara et al.

(10) Patent No.: US 12,052,235 B2
(45) Date of Patent: Jul. 30, 2024

(54) PROTECTING NON-HTTP AND TCP/UDP APPLICATIONS IN A ZTNA/webVPN ENVIRONMENT

(71) Applicant: Cisco Technology, Inc., San Jose, CA (US)

(72) Inventors: George Mathew Koikara, Bangalore (IN); Pruthvi Panyam Nataraj, Bangalore (IN); Naveen Gujje, Bangalore (IN); Sujith RS, Bangalore (IN); Pranav Balakumar, Coimbatore (IN)

(73) Assignee: Cisco Technology, Inc., San Jose, CA (US)

( * ) Notice: Subject to any disclaimer, the term of this patent is extended or adjusted under 35 U.S.C. 154(b) by 212 days.

(21) Appl. No.: 17/866,871

(22) Filed: Jul. 18, 2022

(65) Prior Publication Data
US 2024/0022555 A1   Jan. 18, 2024

(51) Int. Cl.
*H04L 9/40* (2022.01)
*H04L 9/08* (2006.01)
*H04L 67/141* (2022.01)

(52) U.S. Cl.
CPC ...... *H04L 63/0823* (2013.01); *H04L 63/0281* (2013.01); *H04L 67/141* (2013.01)

(58) Field of Classification Search
CPC ............. H04L 63/0823; H04L 63/0281; H04L 67/141
USPC .......................................................... 726/5
See application file for complete search history.

(56) References Cited

U.S. PATENT DOCUMENTS

| | | | |
|---|---|---|---|
| 7,472,201 B1 * | 12/2008 | Aitken ................ | H04L 61/4511 709/245 |
| 7,730,181 B2 * | 6/2010 | Baugher ............. | H04L 63/0823 709/225 |
| 8,265,693 B1 * | 9/2012 | Biere .................... | G06F 16/957 455/418 |
| 8,548,171 B2 * | 10/2013 | McGrew ............... | H04L 9/0891 380/263 |
| 8,677,472 B1 * | 3/2014 | Dotan ................... | H04L 67/131 726/12 |

(Continued)

FOREIGN PATENT DOCUMENTS

| | | |
|---|---|---|
| CN | 104378206 B | 9/2017 |
| EP | 0942568 A2 | 9/1999 |

(Continued)

OTHER PUBLICATIONS

Search Report and Written Opinion mailed Oct. 16, 2023 for PCT Application No. PCT/US2023/027020, 11 pages.

*Primary Examiner* — Haresh N Patel
(74) *Attorney, Agent, or Firm* — Lee & Hayes, P.C.

(57) ABSTRACT

Techniques and architecture are described for protecting non-http and TCP/UDP applications in a zero trust network access (ZTNA)/web virtual private network (VPN) environment by establishing a secure communication channel between a native application and an application server providing an application service. More particularly, the present disclosure describes techniques and architecture that leverage the firewall wherein a thin client on a client device enables a client desktop, establishes a secure channel from a native application, e.g., the client desktop, to the firewall, and acts as a proxy.

20 Claims, 7 Drawing Sheets

(56) References Cited

U.S. PATENT DOCUMENTS

| | | | |
|---|---|---|---|
| 2003/0046589 A1* | 3/2003 | Gregg | H04L 63/0853 |
| | | | 726/5 |
| 2006/0041761 A1* | 2/2006 | Neumann | H04L 63/083 |
| | | | 713/189 |
| 2008/0034413 A1 | 2/2008 | He et al. | |
| 2008/0228865 A1* | 9/2008 | Cruzada | H04L 67/10 |
| | | | 361/679.4 |
| 2010/0306547 A1 | 12/2010 | Fallows et al. | |
| 2014/0337965 A1* | 11/2014 | Savini | H04L 63/0272 |
| | | | 726/15 |
| 2016/0012182 A1* | 1/2016 | Golay | G16H 40/20 |
| | | | 705/3 |
| 2018/0123795 A1 | 5/2018 | Norman et al. | |
| 2019/0356693 A1 | 11/2019 | Cahana et al. | |
| 2020/0218490 A1* | 7/2020 | Noyes | G06F 40/197 |
| 2021/0234860 A1 | 7/2021 | Bansal et al. | |
| 2022/0078209 A1 | 3/2022 | V et al. | |
| 2023/0237155 A1* | 7/2023 | Jacquin | H04L 9/0825 |
| | | | 713/168 |

FOREIGN PATENT DOCUMENTS

| | | | | |
|---|---|---|---|---|
| JP | 2013239045 A | | 11/2013 | |
| JP | 2014182426 A | * | 9/2014 | |
| WO | WO-2014000495 A1 | * | 1/2014 | G06F 3/0622 |

\* cited by examiner

PROTECTING NON-HTTP AND TCP/UDP APPLICATIONS IN A ZTNA/webVPN ENVIRONMENT

TECHNICAL FIELD

The present disclosure relates generally to protecting non-http and TCP/UDP applications in a zero trust network access (ZTNA)/web virtual private network (VPN) environment and more particularly, to establishing a secure communication channel between a native application and an application server providing an application service.

BACKGROUND

There are primarily two types of web (e.g., Internet) access: hypertext transfer protocol (HTTP) and non-HTTP. All web content that uses HTTP is generally straightforward. Other web content access may use transmission control protocol (TCP). Since authentication for access needs to be done at each step of the way, a challenge of ZTNA/webVPN is trying to continuously make sure access is authenticated. Previous web access processes on web browsers, e.g., remote desktop applications, put heavy loads on the network gateway.

In particular, a typical ZTNA/webVPN setup usually caters to HTTPs (hypertext transfer protocol secure) applications wherein the HTTP traffic carries an authentication cookie/token with every access request that is validated first at the gateway and then validated traffic is allowed to the end application server. Typically, for non HTTP/regular TCP or user datagram protocol (UDP) applications, access is first authenticated over HTTP with a web browser and then a tunnel is created over HTTPs for carrying such application traffic. Such a setup requires a HTTPs server on the gateway that needs to decapsulate the HTTP traffic, verify the cookie for authentication, and then route the traffic to the end application server. On the reverse path, the HTTPs server on the gateway needs to encapsulate the traffic and then route it to the client. This process is expensive due to the unwrapping of HTTP, validation of the cookie, and routing of the traffic.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

The present disclosure describes techniques and architecture for protecting non-http and TCP/UDP applications in a zero trust network access (ZTNA)/web virtual private network (VPN) environment by establishing a secure communication channel between a native application and an application server providing an application service. More particularly, the present disclosure describes techniques and architecture that leverage the firewall wherein a thin client on a client device enables a client desktop, establishes a secure channel from a native application, e.g., the client desktop, to the firewall, and acts as a proxy.

In particular, in response to a browser on a client device using an application to access a service that is non-HTTP based, the techniques and architecture described herein provide a certificate and key pair generated by an authentication server or service. The authentication server has the capability to act as a certificate authority (CA)/sub-CA, generate private keys, and sign certificates. The authentication server also generates a cookie and encrypts the certificate and key pair using the cookie. The certificate and key pair are provided to the browser along with the cookie. The authentication server may also provide a profile with details of an endpoint application server behind a network gateway to the browser. In configurations, the certificate, key, cookie, and profile are provided to the browser using security assertion markup language (SAML) redirect, although the techniques and architecture are not limited to SAML redirect and other mechanisms may be used in other configurations. Thus, the network gateway is in front of an endpoint device that provides the service, e.g., an application server.

In configurations, the certificate and key pair are provided, e.g., pushed, to the network gateway, e.g., firewall service at the network gateway (hereinafter referred to as "firewall"), along with the cookie. The firewall has a trust relationship with the authentication server and accepts certificates generated by the authentication server. The authentication server may also provide the profile with details of the endpoint service to the firewall, as well as certificate details and a user identification (ID) related to the authenticated user associated with the client device. In configurations, the certificate details may include a certificate number, e.g., certificate ID, and a time limit for the certificate. Since the certificate could be stolen, in configurations, the certificate may only be used once and may only be valid for a predetermined or configurable amount of time.

In configurations, as an example, the user wishes to access remote desktop protocol (RDP) as a service, which is non-HTTP based. The user uses the browser on the client device, which includes a plugin/extension, to access the RDP. Alternatively, the user may also invoke the RDP client application, which attempts a connection to the RDP service and this traffic is intercepted by a thin client that launches a browser to initiate a connection to the RDP service.

The authentication server validates the credentials of the user and returns three items to the endpoint browser over HTTPs: the cookie; a RDP profile with details of the endpoint service (application server) behind the firewall; and new certificate and key pair signed by the authentication server. The private key is protected using the cookie generated. The certificate has limited validity (possibly in minutes or hours) and may be used only 1 time. The certificate may also have details of which application is to be accessed by the user in this session.

The browser extension detects the certificate and key pair and invokes or passes the certificate and key pair to a thin client on the client device along with the cookie. The thin client is configured to tunnel traffic from the application on the client device to the firewall. Usually, whenever a client device connects to a corporate resource, VPN is used and corporate IP address is used. The thin client does not do this. In contrast, the thin client establishes a secure session, e.g., a secure channel or tunnel, for a particular application. Only traffic from that particular application can use that secure channel created by the thin client. Thus, other applications will use the thin client to create their own secure sessions, e.g., secure channels or tunnels, with their own certificates and keys.

The thin client decrypts the certificate and key using the cookie and along with the certificate connects to the firewall via a secure session, e.g., via mutual transport layer security (mTLS). The validity of certificate is checked by the firewall and if valid, a secure session, e.g., mTLS channel, is established between the thin client and the firewall. For example, the firewall could use the certificate serial number, identification, etc., to validate and keep track of the certificate and whether it has been used. For example, the firewall may maintain a database of certificates and once a certificate is used, the firewall may remove the certificate from the database.

After mTLS establishment, the browser extension invokes a native client application on the client device, e.g., in this example RDP viewer, that needs to connect to the endpoint application server behind the firewall. The invocation is done in a manner that the RDP client connects to a local port on the client device that is serviced by the thin client. For example, the thin client opens a local proxy channel. The RDP application traffic received by the thin client over the local proxy channel is then put on the tunnel, e.g., mTLS channel, and transmitted securely to the firewall, where it is decapsulated and directly routed to the RDP server (endpoint application server) after appropriate inspection on the firewall. In the alternate scenario where the RDP application is launched first and which triggered the browser authentication sequence, the extension may communicate to the RDP application details of the local port on the client device to which the RDP application should connect.

When the user quits using the service, in this example the RDP service, the secure channel between the thin client and the firewall is terminated. If the user wishes to use the service again, a new certificate and key pair is obtained and the process described herein is repeated.

While use of a cookie has been described, there are other ways to generate the mTLS session between the thin client and the firewall. For example, pre-shared mechanisms, e.g., keys, may be used.

As an example, a method may include authenticating, by an authentication server, a client device for access to a network to obtain a network service. The method may also include based at least in part on the authenticating, generating, by the authentication server, a certificate and a key. The method may further include providing, by the authentication server, the certificate and key to the client device. The method may additionally include providing, by the authentication server, the certificate and key to a gateway in front of an endpoint device providing the network service. The method may also include initiating, by a thin client on the client device, a secure session by providing at least the certificate and the key to the gateway. The method may further include verifying, by the gateway, the certificate and the key provided by the thin client. The method may additionally include based at least in part on the certificate and key, establishing the secure session between the thin client on the client device and the gateway. The method may also include launching a native application on the client device. The method may further include providing a local proxy channel between the thin client and the native application. The method may additionally include routing traffic between the native application and the endpoint device over the secure session and the local proxy channel via the thin client.

In configurations, the method may further include generating, by the authentication server, a cookie. In such configurations, the method may also include prior to providing the certificate and key to the client device, encrypting, by the authentication server, the certificate and key with the cookie and providing, by the authentication server, the certificate and key to the client device with the cookie. In such configurations, the method may additionally include prior to initiating the secure session between the thin client on the client device and the gateway, decrypting, by the thin client, the certificate and the key using the cookie.

In configurations, the method may also include providing, by the authentication server, the certificate and key to the gateway with the cookie and decrypting, by the gateway, the certificate and the key using the cookie.

In configurations, the certificate has a limited validity based at least in part on an amount of time.

In configurations, providing the certificate and key to the gateway further comprises providing certificate details to the gateway and the method may further include based at least in part on the certificate details, determining a validity of the certificate.

In configurations, the certificate details comprise a certificate identification (ID) and determining the validity of the certificate comprises determining, based at least in part on the certificate ID, if the certificate has been previously provided to the gateway by an entity other than the authentication server.

In configurations, determining if the certificate has been previously provided to the gateway by an entity other than the authentication server comprises searching a database for the certificate ID.

In configurations, the method may further include upon receipt of the certificate from the authentication server, storing, by the gateway, the certificate ID in the database and based at least in part on verifying, by the gateway, the certificate and the key provided by the thin client, removing the certificate ID from the database.

In configurations, the method may further include prior to initiating, by the thin client, the secure session by providing at least the certificate and the key to the gateway, establishing a trusted relationship between the thin client and the gateway via a pre-shared mechanism.

Thus, the techniques and architecture described herein enable secure remote access (as well as access to other network services) for non-HTTP and legacy applications on un-managed clients through single use certificate and key pairs based mTLS connection. The techniques and architecture described herein leverage existing firewall as the gateway to terminate the mTLS connection and forward the traffic to a backend application server. The techniques and architecture described herein provide a unique way of authenticating non HTTP client connections. The techniques and architecture described herein provide low performance overhead since the gateway (firewall) does not have to validate cookies as the connection is created and secured using mTLS.

The techniques described herein may be performed by a system and/or device having non-transitory computer-readable media storing computer-executable instructions that, when executed by one or more processors, performs the method described above.

EXAMPLE EMBODIMENTS

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1A:
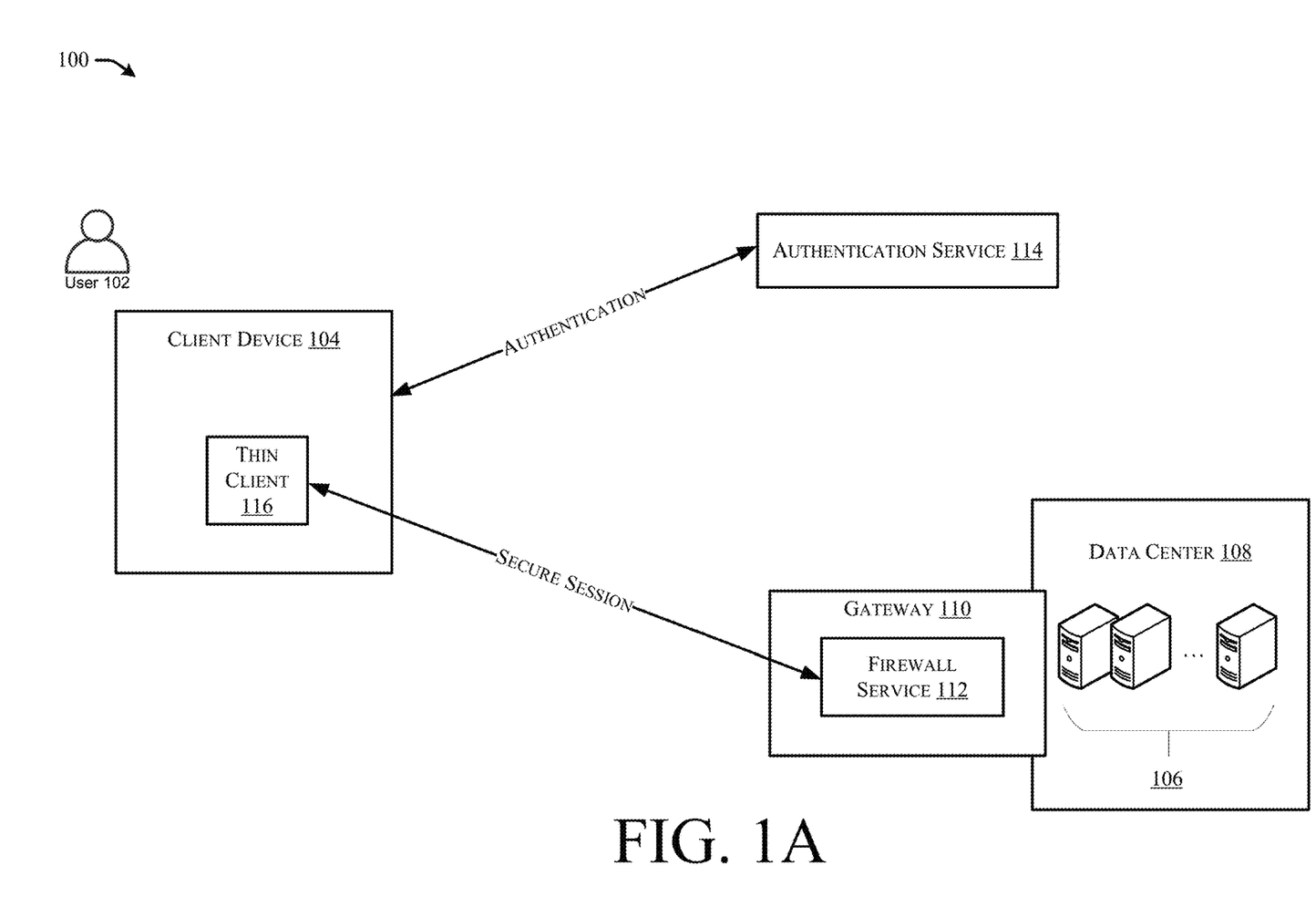
FIGS. 1A-1D schematically illustrate an example network arrangement of a portion of a network wherein a secure communication channel between a native application and an application server providing an application service is established in accordance with aspects of the present disclosure.

FIG. 1A schematically illustrates a portion of a network 100. The network 100 includes a user 102 that uses a client device 104 to access and/or obtain a network service or application from one or more servers 106 at a data center 108. The data center 108 is behind a gateway 110 that includes a firewall service 112 (hereinafter referred to as "firewall" 112). The user 102 and/or client device 104 may be authenticated by an authentication service or server 114, which may be located, for example, in the cloud or may be part of an enterprise on-premises network. The client device 104 includes a thin client 116 that may be used to interact with the firewall 112 via a secure session, as will be described further herein. The network 100 may represent a fabric network, an extended network, or an external network.

Figure 1B:
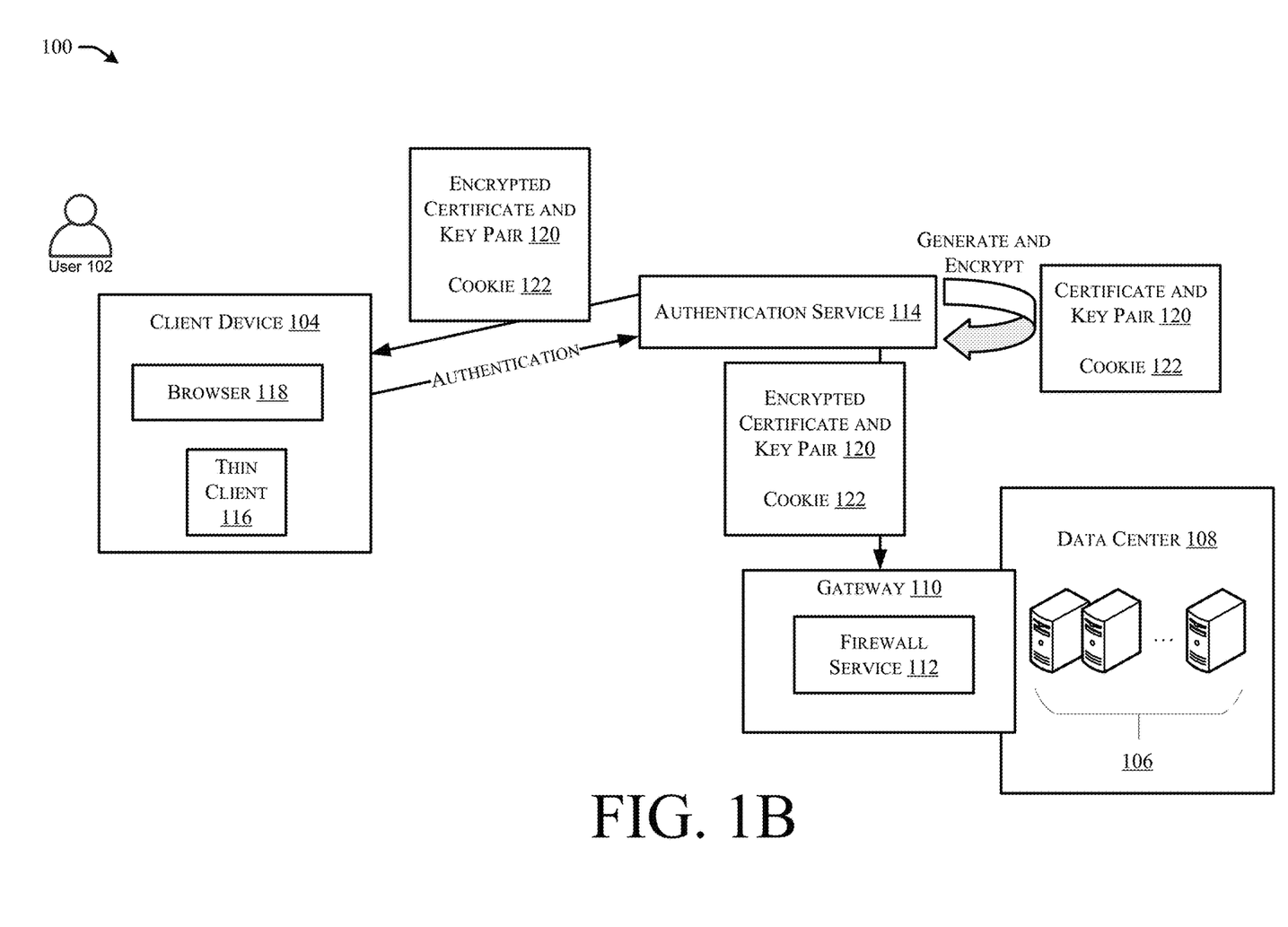

Referring to FIG. 1B, the user 102 wishes to access a network service or application, for example, remote desktop protocol (RDP) service. The RDP service may be provided by the one or more servers 106 at the data center 108. The user 102 utilizes the client device 104 that includes, for example, a browser 118 thereon. The user 102 utilizes the client device 104 to initiate and/or request authentication from the authentication service 114, which may be in the form of one or more servers. Upon authentication of the user 102 and/or the client device 104, the authentication service 114 generates a certificate and key pair 120. In configurations, the authentication service 114 also generates a cookie 122, which is used to encrypt the certificate and key pair 120. The authentication service 114 provides the encrypted certificate and key pair 120 along with the cookie 122 to the client device 102. In configurations, the encrypted certificate and key pair 120 along with the cookie 122 are sent to the client device 104 from the authentication service 114 using security assertion markup language (SAML) redirect.

In configurations, the authentication service 114 pushes the encrypted certificate and key pair 120 with the cookie 122 to the firewall 112 at the gateway 110. In configurations, the authentication service 114 also pushes a user identification (ID), an ID of the network service or application, and certificate details to the firewall, e.g. a certificate ID (serial number), time validity for the certificate, etc. In configurations, the authentication service 114 may push the encrypted certificate and key pair 120 with the cookie 122 to the firewall 112 at the gateway 110 at the same time the authentication service 114 provides the encrypted certificate and key pair 120 along with the cookie 122 to the client device 102. The gateway 110 and firewall 112 are in front of the data center 108 that includes the one or more servers 106, e.g., endpoint application servers, that provide the network service, e.g., RDP service.

Figure 1C:
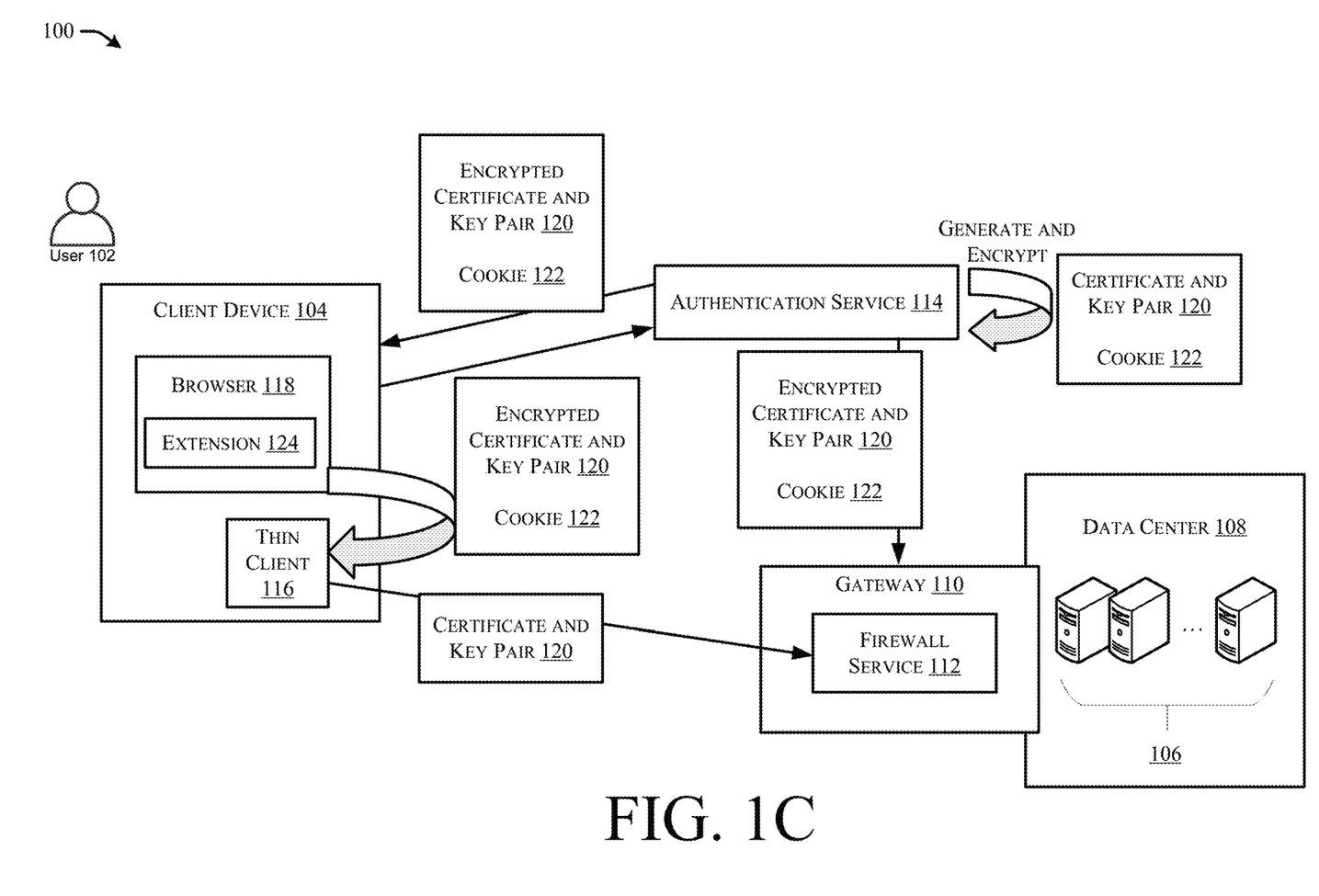

Referring to FIG. 1C, the browser 118 on the client device 104 includes a plug-in or extension 124. The extension 124 detects the encrypted certificate and key 120 as well as the cookie 122. The extension 124 provides the encrypted certificate and key pair 120 along with the cookie 122 to the thin client 116. The thin client 116 decrypts the certificate and key pair 120 using the cookie 122. The thin client 116 operates as a service in the background on the desktop itself of the client device 104 and enables establishment of a secure channel or session with the firewall 112 while also at the same time acting as a local proxy on the desktop of the client device 104. Thus, the plug-in or extension 124 on the browser 118 interacts with the thin client 116 and launches the thin client 116.

Using the certificate and key pair 120, the thin client 116 initiates a secure session with the firewall 112. The firewall 112 verifies, e.g., validates, the certificate and then establishes the secure session with the thin client 116. In configurations, the secure session is a mutual transport layer security (mTLS) channel.

Figure 1D:
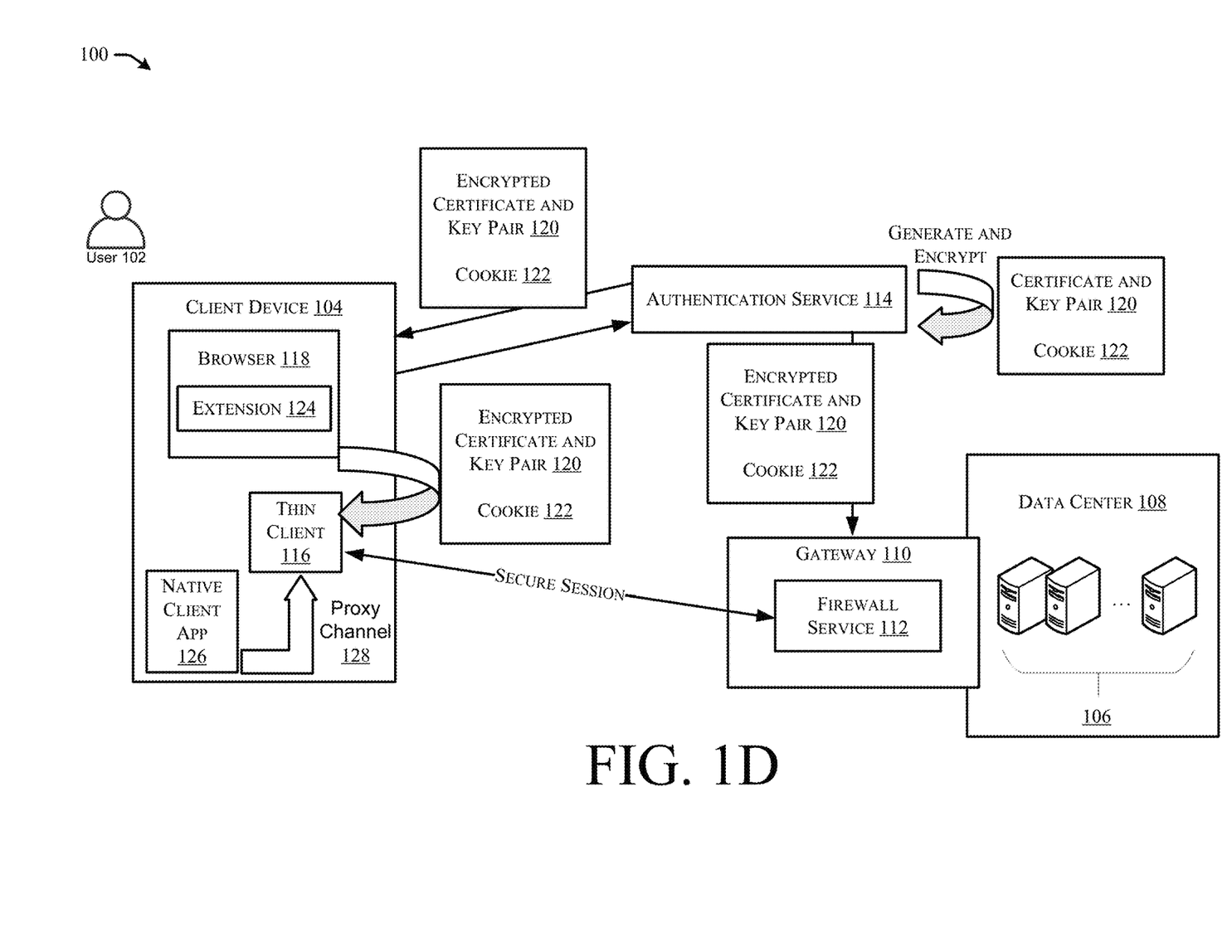

Referring to FIG. 1D, after the mTLS channel establishment, the extension 124 invokes a native client application 126 on the client device 104, for example, a RDP viewer, that needs to connect to the endpoint application server(s) 106 in the data center 108 in order to obtain the network service or application, e.g., RDP service. The thin client 116 then opens a local proxy channel 128 and indicates to the native application 126, e.g., RDP viewer, to connect to the proxy channel 128. The native application 126 now provides traffic from the client device 104 to the thin client 116 destined for the end point application server(s) 106. The thin client 116 places the traffic on the mTLS channel and forwards it to the firewall 112. The firewall 112 decrypts the traffic and provides it to the end point application server(s) 106. The end point application server(s) likewise may provide return traffic to the firewall 112, which encrypts the traffic and places it on the mTLS channel to provide it to the thin client 116. The thin client 116 may decrypt the traffic and provide it to the native application 126, e.g., the RDP viewer, on the proxy channel 128.

Once the session is terminated, in order to connect again with the end point application server(s) 106, the client device 106 repeats the steps described herein, e.g., be authenticated by the authentication service 114 and obtain a new certificate and key, as well as a cookie that encrypts the new certificate and key pair. In configurations, each certificate may be valid only for a predetermined amount of time, e.g., one to three minutes. Longer periods of time or shorter periods of time may also be utilized for validity of the certificate. Additionally, in configurations, the certificate may only be used once. Thus, in configurations, the firewall 112 may maintain a database 130 of certificates received from the authentication service 114. Once a certificate has been used, the firewall 112 may delete the certificate from the database 130. Thus, for validating a certificate received from the thin client 116, the firewall 112 may search the database 130. If the certificate is present in the database 130, then the firewall 112, assuming the certificate has not expired due to time constraints, realizes that the certificate is valid and establishes the mTLS session with the thin client 116. The firewall 112 may then delete the certificate from the database 130. However, if the certificate is not present within the database 130, then the firewall 112 realizes that the certificate has already been used and does not establish the mTLS session.

Figure 2:
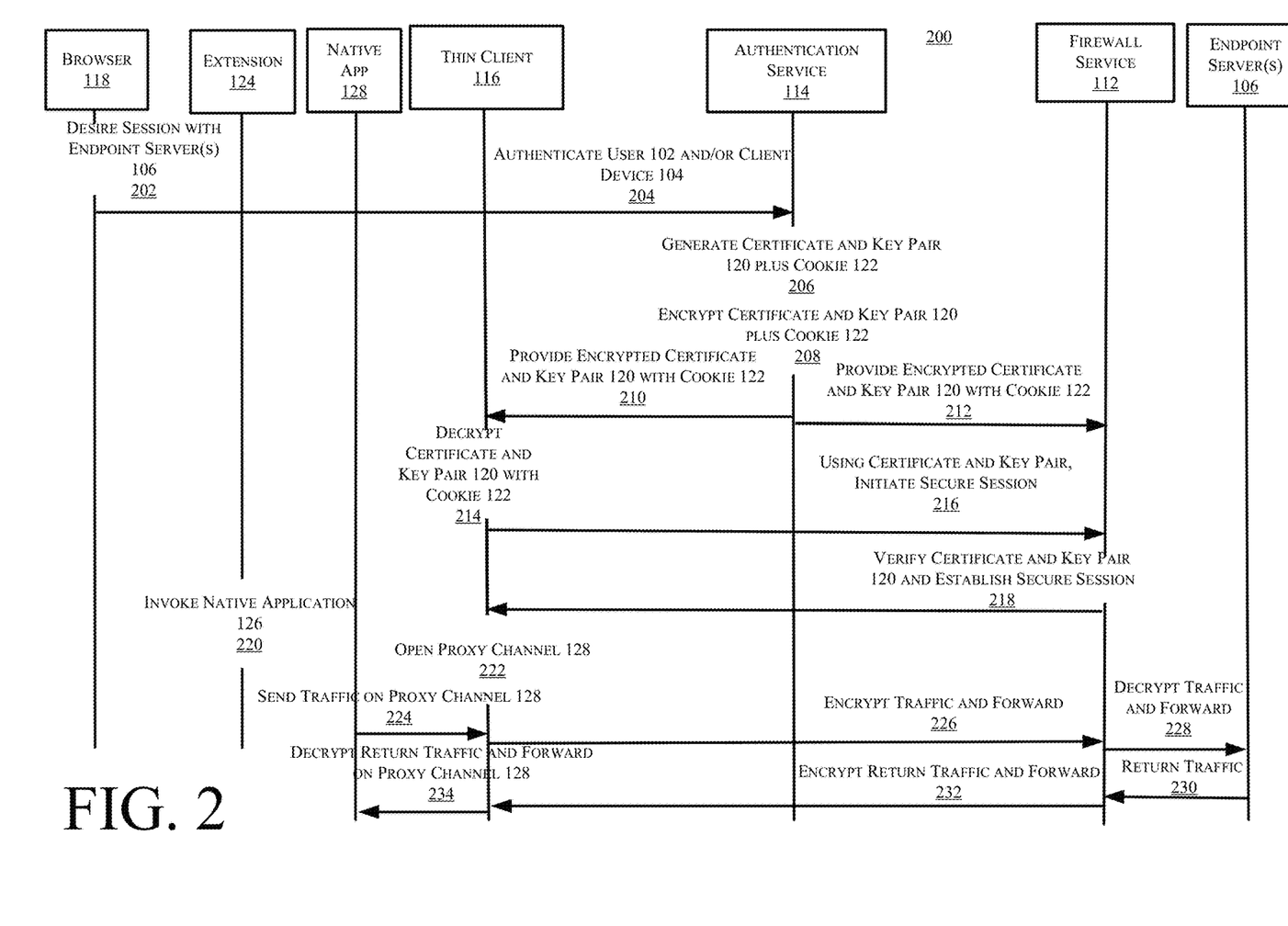
FIG. 2 schematically illustrates an example workflow for establishing a secure communication channel between a native application and an application server providing an application service in accordance with aspects of the present disclosure.

Referring to FIG. 2, a workflow diagram 200 for establishing a secure communication channel between a native application and an application server providing an application service in accordance with aspects of the present disclosure begins at 202 with a user, e.g., user 102, wishing to establish a session using a browser, e.g., browser 118, with endpoint application server(s) 106 behind the firewall 112. At 204, the user 102 and/or client device 104 are authenticated by authentication service 114 on a HTTP flow. The authentication may be via, for example, a multi-step authentication.

At 206, the authentication service 114 generates a certificate and key pair 120, plus a cookie 122. At 208, the authentication service 114 encrypts that certificate and key pair 120 using the cookie 122. At 210, the authentication service 114 sends the encrypted certificate and key pair 120 along with the cookie 122 to browser 118 on the client device 104 from the authentication service 114 using security assertion markup language (SAML) redirect, while at 212 the authentication service 114 pushes the encrypted certificate and key pair 120 with the cookie 122 to the firewall 112 at the gateway 110. The authentication service 114 also pushes a user identification (ID), an ID of the network service or application, and certificate details to the firewall, e.g. a certificate ID (serial number), time validity for the certificate, etc. In configurations, the authentication service 114 may push the encrypted certificate and key pair 120 with the cookie 122 to the firewall 112 at the gateway 110 at the same time the authentication service 114 provides the encrypted certificate and key pair 120 along with the cookie 122 to the client device 102.

At 214, the thin client decrypts the certificate and key pair 120 using the cookie 118. At 216, using the certificate and key pair 120, the thin client 116 initiates a secure session with the firewall 112. At 218, the firewall 112 validates the certificate and key pair 120 and then establishes the secure session with the thin client 116, e.g., has the certificate been used before, has the certificate expired, etc. In configurations, the secure session is a mutual transport layer security (mTLS) channel. In general, the firewall 112 trusts the certificate and key pair 120 because the certificate and key pair 120 was generated by the authentication service 114.

At 220, the extension 124 invokes a native client application 126, e.g., RDP or secure shell (SSH) protocol on the client device 104, that needs to connect to the endpoint application server(s) 106 in the data center 108 in order to obtain the network service or application, e.g., RDP service. At 222, the thin client 116 then opens a local proxy channel 128 and indicates to the native application 126 to connect to the proxy channel 128. At 224, the native application 126 now provides traffic from the client device 104 to the thin client 116 destined for the end point application server(s) 106. At 226, the thin client 116 places the traffic on the mTLS channel and forwards it to the firewall 112. At 228, the firewall 112 decrypts the traffic and provides it to the end point application server(s) 106. At 230, the end point application server(s) likewise may provide return traffic to the firewall 112, which, at 232, encrypts the traffic and places it on the mTLS channel to provide it to the thin client 116. At 234, the thin client 116 may decrypt the traffic and provide it to the native application 126, e.g., the RDP viewer, on the proxy channel 128.

Thus, in response to the browser 118 on the client device 104 using an application to access a service that is non-HTTP based, the techniques and architecture described herein provide a certificate and key pair 120 generated by the authentication service 114. The authentication service 114 has the capability to act as a certificate authority (CA)/sub-CA, generate private keys, and sign certificates. The authentication service 114 also generates a cookie 122 and encrypts the certificate and key pair 120 using the cookie 122.

The certificate and key pair 120 are provided to the browser 118 along with the cookie 122. The authentication service 114 may also provide a profile with details of an endpoint application server(s) 106 behind the firewall 112 to the browser 118. In configurations, the certificate, key, cookie, and profile are provided to the browser using security assertion markup language (SAML) redirect. Thus, the firewall is in front of an endpoint device that provides the desired network service, e.g., an endpoint application server(s) 106.

In configurations, the certificate and key pair 120 are provided, e.g., pushed, to the firewall 112 at the network gateway 110, along with the cookie 122. The firewall 112 has a trust relationship with the authentication service 114 and accepts certificates generated by the authentication service 114. The authentication service 114 may also provide the profile with details of the endpoint service to the firewall 112, as well as certificate details and a user identification (ID) related to the authenticated user 102 associated with the client device 104. In configurations, the certificate details may include a certificate number, e.g., certificate ID, and a time limit for the certificate. Since the certificate could be stolen, in configurations, the certificate may only be used once and may only be valid for a predetermined amount of time.

In configurations, as an example, the user 102 wishes to access remote desktop protocol (RDP) as a service at the endpoint application server(s) 106, which is non-HTTP based. The user uses the browser 118 on the client device 104, which includes the plug-in/extension 124, to access the RDP service.

The authentication service 114 validates the credentials of the user 102 and returns three items to the endpoint browser 118 over HTTPs: the cookie 122; a RDP profile with details of the endpoint service (application server(s) 106) behind the firewall 112; and a new certificate and key pair 120 signed by the authentication server. The private key is protected using the generated cookie 122. The certificate has limited validity (possibly in minutes or hours) and may be used only 1 time. The certificate may also have details of which application is to be accessed by the user 102 in this session.

The browser extension 124 detects the certificate and key pair 120 and invokes or passes the certificate and key pair 120 to the thin client 116 on the client device 104 along with the cookie 122. The thin client 116 is configured to tunnel traffic from the application on the client device 104 to the firewall 112. Usually, whenever a client device 104 connects to a corporate resource, VPN is used and corporate IP address is used. The thin client 116 does not do this. In contrast, the thin client 116 establishes a secure session, e.g., a secure channel or tunnel, for a particular application. Only traffic from that particular application can use that secure channel created by the thin client 116. Thus, other applications will use the thin client 116 to create their own secure sessions, e.g., secure channels or tunnels, with their own certificates and keys.

The thin client 116 decrypts the certificate and key pair 120 using the cookie 122 and along with the certificate connects to the firewall 112 via a secure session, e.g., via mutual transport layer security (mTLS). The validity of certificate is checked by the firewall 112 and if valid, a secure session, e.g., mTLS channel, is established between the thin client 116 and the firewall 112. For example, the firewall 112 could use the certificate serial number, identification, etc., to validate and keep track of the certificate and whether it has been used. For example, the firewall 112 may maintain a database 130 of certificates and once a certificate is used, the firewall 112 may remove the certificate from the database 130.

After mTLS establishment, the browser extension 124 invokes a native client application 126 on the client device 104, e.g., in this example RDP viewer, that needs to connect to the endpoint application server(s) 106 behind the firewall 112. The invocation is done in a manner that the RDP client (viewer) connects to a local port on the client device 104 that is serviced by the thin client 116. For example, the thin client 116 opens a local proxy channel 128. The RDP application traffic received by the thin client 116 over the local proxy channel 128 is then put on the tunnel, e.g., mTLS channel, and transmitted securely to the firewall 112, where it is decapsulated and directly routed to the RDP server (endpoint application server(s) 106) after appropriate inspection on the firewall 112. Return traffic from the RDP server (endpoint application server(s) 106) is forwarded to the firewall 112, which encrypts that return traffic and places the encrypted traffic on the tunnel, e.g., mTLS channel destined for the thin client 116. The thin client 116 decrypts the return traffic and places the return traffic on the proxy channel 128 destined for the native application 126, e.g., RDP viewer.

When the user 102 quits using the service, in this example the RDP service, the secure channel between the thin client 116 and the firewall 112 is terminated. If the user 102 wishs to use the service again, a new certificate and key pair is obtained and the process described herein is repeated.

While use of a cookie 122 has been described, there are other ways to generate the mTLS session between the thin client 116 and the firewall 112. For example, pre-shared mechanisms, e.g., keys, may be used.

Figure 3:
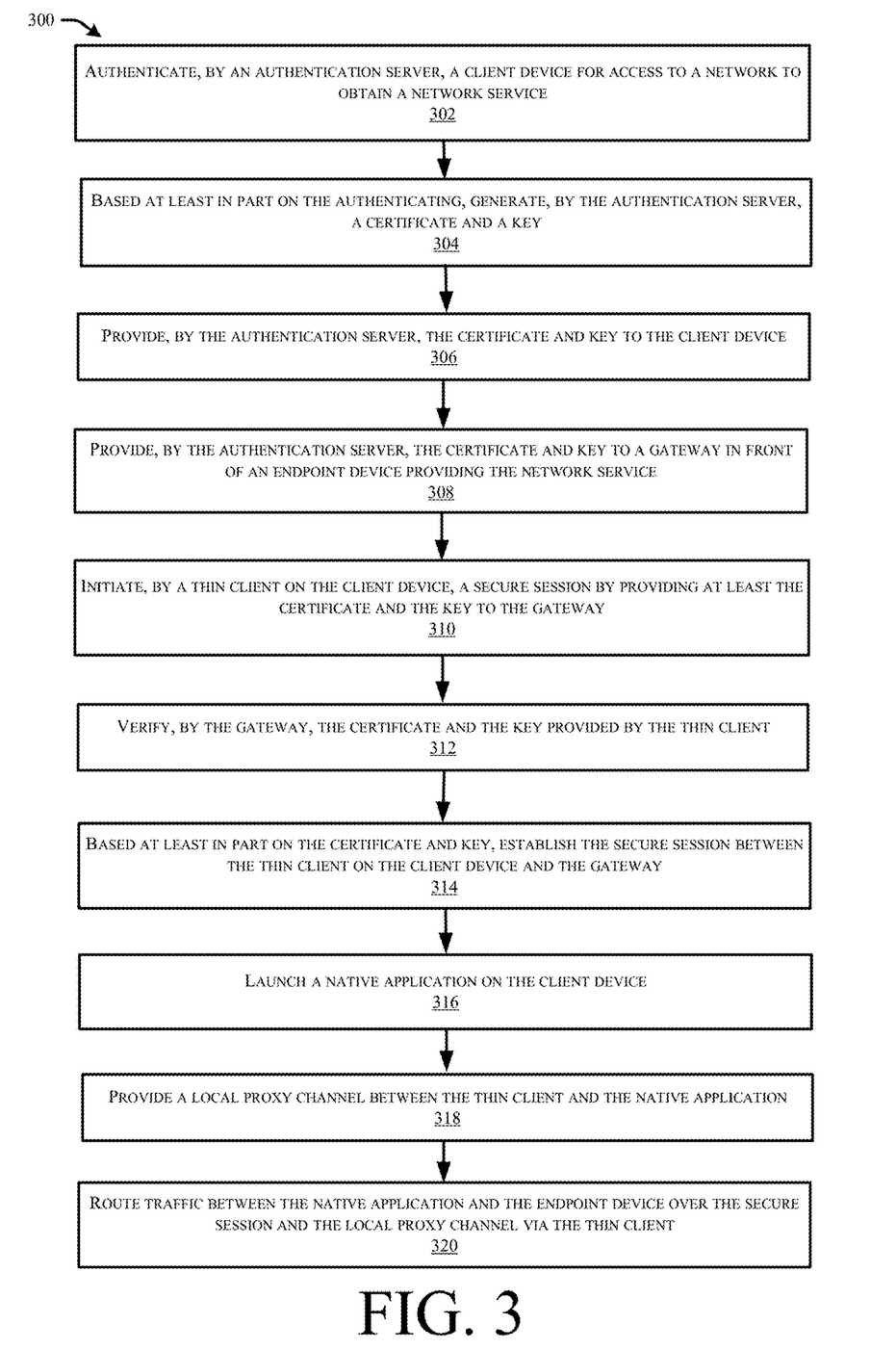
FIG. 3 illustrates a flow diagram of an example method for establishing a secure communication channel between a native application and an application server providing an application service.

FIG. 3 illustrates a flow diagram of an example method 300 and illustrates aspects of the functions performed at least partly by network devices of a network as described with respect to FIGS. 1A-1D and 2. The logical operations described herein with respect to FIG. 4 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 3 illustrates a flow diagram of an example method 300 for establishing a secure communication channel between a native application and an application server providing an application service. In some examples, the method 300 may be performed by a system comprising one or more processors and one or more non-transitory computer-readable media storing computer-executable instructions that, when executed by the one or more processors, cause the one or more processors to perform the method 300.

At 302, a client device is authenticated by an authentication service for access to a network to obtain a network service. For example, the user 102 utilizes the client device 104 to initiate and/or request authentication from the authentication service 114, which may be in the form of one or more servers.

At 304, based at least in part on the authenticating, a certificate and a key are generated by the authentication server. For example, upon authentication of the user 102 and/or the client device 104, the authentication service 114 generates a certificate and key pair 120. In configurations, the authentication service 114 also generates a cookie 122, which is used to encrypt the certificate and key pair 120.

At 306, the certificate and key are provided by the authentication service to the client device. For example, the authentication service 114 provides the encrypted certificate and key pair 120 along with the cookie 122 to the client device 102. In configurations, the encrypted certificate and key pair 120 along with the cookie 122 are sent to the client device 104 from the authentication service 114 using security assertion markup language (SAML) redirect.

At 308, the certificate and key are provided by the authentication service to a gateway in front of an endpoint device providing the network service. For example, the authentication service 114 pushes the encrypted certificate and key pair 120 with the cookie 122 to the firewall 112 at the gateway 110. In configurations, the authentication service 114 also pushes a user identification (ID), an ID of the network service or application, and certificate details to the firewall, e.g. a certificate ID (serial number), time validity for the certificate, etc. In configurations, the authentication service 114 may push the encrypted certificate and key pair 120 with the cookie 122 to the firewall 112 at the gateway 110 at the same time the authentication service 114 provides the encrypted certificate and key pair 120 along with the cookie 122 to the client device 102. The gateway 110 and firewall 112 are in front of the data center 108 that includes the one or more servers 106, e.g., endpoint application servers, that provide the network service.

At 310, a secure session is initiated by a thin client on the client device by providing at least the certificate and the key to the gateway. For example, the browser 118 on the client device 104 includes a plug-in or extension 124. The extension 124 detects the encrypted certificate and key 120 as well as the cookie 122. The extension 124 provides the encrypted certificate and key pair 120 along with the cookie 122 to the thin client 116. The thin client 116 decrypts the certificate and key pair 120 using the cookie 122. The thin client 116 operates as a service in the background on the desktop itself of the client device 104 and enables establishment of a secure channel or session with the firewall 112 while also at the same time acting as a local proxy on the desktop of the client device 104. Thus, the plug-in or extension 124 on the browser 118 interacts with the thin client 116 and launches the thin client 116. Using the certificate and key pair 120, the thin client 116 initiates a secure session with the firewall 112.

At 312, the certificate and the key provided by the thin client are verified by the gateway. At 314, based at least in part on the certificate and key, the secure session is established between the thin client on the client device and the gateway. For example, the firewall 112 validates the certificate and then establishes the secure session with the thin client 116. In configurations, the secure session is a mutual transport layer security (mTLS) channel.

At 316, a native application is launched on the client device. For example, after the mTLS channel establishment, the extension 124 invokes a native client application 126 on the client device 104 that needs to connect to the endpoint application server(s) 106 in the data center 108 in order to obtain the network service or application.

At 318, a local proxy channel is provided between the thin client and the native application. For example, the thin client 116 then opens a local proxy channel 128 and indicates to the native application 126 to connect to the proxy channel 128.

At 320, traffic is routed between the native application and the endpoint device over the secure session and the local proxy channel via the thin client. For example, the native application 126 provides traffic from the client device 104 to the thin client 116 destined for the end point application server(s) 106. The thin client 116 places the traffic on the mTLS channel and forwards it to the firewall 112. The firewall 112 decrypts the traffic and provides it to the end point application server(s) 106. The end point application server(s) likewise may provide return traffic to the firewall 112, which encrypts the traffic and places it on the mTLS channel to provide it to the thin client 116. The thin client 116 may decrypt the traffic and provide it to the native application 126 on the proxy channel 128.

Thus, the techniques and architecture described herein enable secure remote access (as well as access to other network services) for non-HTTP and legacy applications on un-managed clients through single use certificate and key pairs based mTLS connection. The techniques and architecture described herein leverage existing firewall as the gateway to terminate the mTLS connection and forward the traffic to a backend application server. The techniques and architecture described herein provide a unique way of authenticating non HTTP client connections. The techniques and architecture described herein provide low performance overhead since the gateway (firewall) does not have to validate cookies as the connection is created and secured using mTLS.

Figure 4:
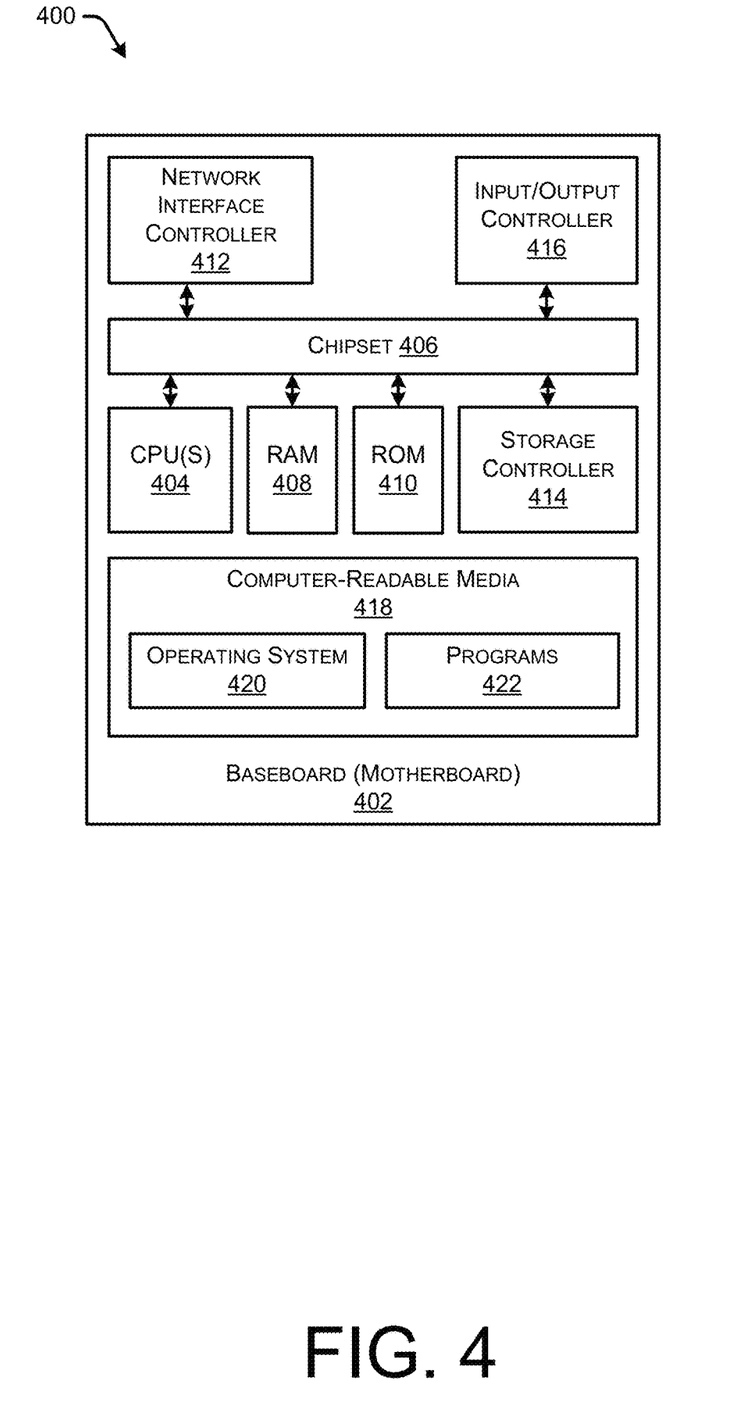
FIG. 4 is a computer architecture diagram showing an example computer hardware architecture for implementing a device that can be utilized to implement aspects of the various technologies presented herein.

FIG. 4 shows an example computer architecture for a computing device 400 capable of executing program components for implementing the functionality described above. In configurations, one or more of the computing devices 400 may be used to implement one or more of the components of FIGS. 1-3. The computer architecture shown in FIG. 4 illustrates a conventional server computer, workstation, desktop computer, laptop, tablet, network appliance, e-reader, smartphone, or other computing device, and can be utilized to execute any of the software components presented herein. The computing device 400 may, in some examples, correspond to a physical device or resources described herein.

The computing device 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computing device 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computing device 400. The chipset 406 can further provide an interface to a computer-readable storage medium such as a read-only memory ("ROM") 410 or non-volatile RAM ("NVRAM") for storing basic routines that help to startup the computing device 400 and to transfer information between the various components and devices. The ROM 410 or NVRAM can also store other software components necessary for the operation of the computing device 400 in accordance with the configurations described herein.

The computing device 400 can operate in a networked environment using logical connections to remote computing devices and computer systems through a network, such as the arrangement 100. The chipset 406 can include functionality for providing network connectivity through a NIC 412, such as a gigabit Ethernet adapter. In configurations, the NIC 412 a smart NIC (based on data processing units (DPUs)) that can be plugged into data center servers to provide networking capability. The NIC 412 is capable of connecting the computing device 400 to other computing devices over networks. It should be appreciated that multiple NICs 412 can be present in the computing device 400, connecting the computer to other types of networks and remote computer systems.

The computing device 400 can be connected to a storage device 418 that provides non-volatile storage for the computer. The storage device 418 can store an operating system 420, programs 422, and data, which have been described in greater detail herein. The storage device 418 can be connected to the computing device 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computing device 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 400 can further read information from the storage device 418 by detecting the physical states or characteristics of one or more particular locations within the physical storage units.

In addition to the mass storage device 418 described above, the computing device 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 400. In some examples, the operations performed by the cloud network, and or any components included therein, may be supported by one or more devices similar to computing device 400. Stated otherwise, some or all of the operations described herein may be performed by one or more computing devices 400 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computing device 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 418 can store other system or application programs and data utilized by the computing device 400.

In one embodiment, the storage device 418 or other computer-readable storage media is encoded with computer-executable instructions which, when loaded into the computing device 400, transform the computer from a general-purpose computing system into a special-purpose computer capable of implementing the embodiments described herein. These computer-executable instructions transform the computing device 400 by specifying how the CPUs 404 transition between states, as described above. According to one embodiment, the computing device 400 has access to computer-readable storage media storing computer-executable instructions which, when executed by the computing device 400, perform the various processes described above with regard to FIGS. 1-3. The computing device 400 can also include computer-readable storage media having instructions stored thereupon for performing any of the other computer-implemented operations described herein.

The computing device 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computing device 400 might not include all of the components shown in FIG. 4, can include other components that are not explicitly shown in FIG. 4, or might utilize an architecture completely different than that shown in FIG. 4.

The computing device 400 may support a virtualization layer, such as one or more virtual resources executing on the computing device 400. In some examples, the virtualization layer may be supported by a hypervisor that provides one or more virtual machines running on the computing device 400 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
authenticating, by an authentication service, a client device for access to a network to obtain a network service;
based at least in part on the authenticating, generating, by the authentication service, a certificate and a key;
providing, by the authentication service, the certificate and key to the client device;
providing, by the authentication service, the certificate and key to a gateway in front of an endpoint device providing the network service;
initiating, by a thin client on the client device, a secure session by providing at least the certificate and the key to the gateway;
verifying, by the gateway, the certificate and the key provided by the thin client;
based at least in part on the certificate and key, establishing the secure session between the thin client on the client device and the gateway;
launching a native application on the client device;
providing a local proxy channel between the thin client and the native application; and
routing traffic between the native application and the endpoint device over the secure session and the local proxy channel via the thin client.

2. The method of claim 1, further comprising:
generating, by the authentication service, a cookie;
prior to providing the certificate and key to the client device, encrypting, by the authentication service, the certificate and key with the cookie;
providing, by the authentication service, the certificate and key to the client device with the cookie; and
prior to initiating the secure session between the thin client on the client device and the gateway, decrypting, by the thin client, the certificate and the key using the cookie.

3. The method of claim 2, further comprising:
providing, by the authentication service, the certificate and key to the gateway with the cookie; and
decrypting, by the gateway, the certificate and the key using the cookie.

4. The method of claim 1, wherein the certificate has a limited validity based at least in part on an amount of time.

5. The method of claim 1, wherein:
providing the certificate and key to the gateway further comprises providing certificate details to the gateway; and
the method further comprises based at least in part on the certificate details, determining a validity of the certificate.

6. The method of claim 5, wherein:
the certificate details comprise a certificate identification (ID); and
determining the validity of the certificate comprises determining, based at least in part on the certificate ID, if the certificate has been previously provided to the gateway by an entity other than the authentication service.

7. The method of claim 6, wherein determining if the certificate has been previously provided to the gateway by an entity other than the authentication service comprises searching a database for the certificate ID.

8. The method of claim 7, further comprising:
upon receipt of the certificate from the authentication service, storing, by the gateway, the certificate ID in the database; and
based at least in part on verifying, by the gateway, the certificate and the key provided by the thin client, removing the certificate ID from the database.

9. The method of claim 1, further comprising:
prior to initiating, by the thin client, the secure session by providing at least the certificate and the key to the gateway, establishing a trusted relationship between the thin client and the gateway via a pre-shared mechanism.

10. A system comprising:
one or more processors; and
one or more non-transitory computer-readable media storing computer-executable instructions that, when executed by the one or more processors, cause the one or more processors to perform actions comprising:
authenticating, by an authentication service, a client device for access to a network to obtain a network service;
based at least in part on the authenticating, generating, by the authentication service, a certificate and a key;
providing, by the authentication service, the certificate and key to the client device;
providing, by the authentication service, the certificate and key to a gateway in front of an endpoint device providing the network service;
initiating, by a thin client on the client device, a secure session by providing at least the certificate and the key to the gateway;
verifying, by the gateway, the certificate and the key provided by the thin client;
based at least in part on the certificate and key, establishing the secure session between the thin client on the client device and the gateway;
launching a native application on the client device;
providing a local proxy channel between the thin client and the native application; and
routing traffic between the native application and the endpoint device over the secure session and the local proxy channel via the thin client.

11. The system of claim 10, wherein the actions further comprise:
generating, by the authentication service, a cookie;
prior to providing the certificate and key to the client device, encrypting, by the authentication service, the certificate and key with the cookie;
providing, by the authentication service, the certificate and key to the client device with the cookie; and
prior to initiating the secure session between the thin client on the client device and the gateway, decrypting, by the thin client, the certificate and the key using the cookie.

12. The system of claim 11, wherein the actions further comprise:
providing, by the authentication service, the certificate and key to the gateway with the cookie; and
decrypting, by the gateway, the certificate and the key using the cookie.

13. The system of claim 10, wherein the certificate has a limited validity based at least in part on an amount of time.

14. The system of claim 10, wherein:
providing the certificate and key to the gateway further comprises providing certificate details to the gateway; and
the actions further comprise based at least in part on the certificate details, determining a validity of the certificate.

15. The system of claim 14, wherein:
the certificate details comprise a certificate identification (ID); and
determining the validity of the certificate comprises determining, based at least in part on the certificate ID, if the certificate has been previously provided to the gateway by an entity other than the authentication service.

16. The system of claim 15, wherein determining if the certificate has been previously provided to the gateway by an entity other than the authentication service comprises searching a database for the certificate ID.

17. The system of claim 16, wherein the actions further comprise:
upon receipt of the certificate from the authentication service, storing, by the gateway, the certificate ID in the database; and
based at least in part on verifying, by the gateway, the certificate and the key provided by the thin client, removing the certificate ID from the database.

18. The system of claim 10, wherein the actions further comprise:
prior to initiating, by the thin client, the secure session by providing at least the certificate and the key to the gateway, establishing a trusted relationship between the thin client and the gateway via a pre-shared mechanism.

19. One or more non-transitory computer-readable media storing computer-executable instructions that, when executed by one or more processors, cause the one or more processors to perform actions comprising:

authenticating, by an authentication service, a client device for access to a network to obtain a network service;

based at least in part on the authenticating, generating, by the authentication service, a certificate and a key;

providing, by the authentication service, the certificate and key to the client device;

providing, by the authentication service, the certificate and key to a gateway in front of an endpoint device providing the network service;

initiating, by a thin client on the client device, a secure session by providing at least the certificate and the key to the gateway;

verifying, by the gateway, the certificate and the key provided by the thin client;

based at least in part on the certificate and key, establishing the secure session between the thin client on the client device and the gateway;

launching a native application on the client device;

providing a local proxy channel between the thin client and the native application; and     routing traffic between the native application and the endpoint device over the secure session and the local proxy channel via the thin client.

20. The one or more non-transitory computer-readable media of claim 19, wherein the actions further comprise:

generating, by the authentication service, a cookie;

prior to providing the certificate and key to the client device, encrypting, by the authentication service, the certificate and key with the cookie;

providing, by the authentication service, the certificate and key to the client device with the cookie; and     prior to initiating the secure session between the thin client on the client device and the gateway, decrypting, by the thin client, the certificate and the key using the cookie.

\* \* \* \* \*